(12) United States Patent
Price et al.

(10) Patent No.: US 9,189,312 B2
(45) Date of Patent: Nov. 17, 2015

(54) GENERIC PROGRAMMING FOR DIAGNOSTIC MODELS

(71) Applicants: Palo Alto Research Center Incorporated, Palo Alto, CA (US); Xerox Corporation, Norwalk, CT (US)

(72) Inventors: Robert R Price, Palo Alto, CA (US); Juan Liu, Cupertino, CA (US); Eric S Hamby, Webster, NY (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 355 days.

(21) Appl. No.: 13/789,770

(22) Filed: Mar. 8, 2013

(65) Prior Publication Data

US 2014/0258186 A1 Sep. 11, 2014

(51) Int. Cl.
*G06F 15/18* (2006.01)
*G06F 11/07* (2006.01)

(52) U.S. Cl.
CPC .......... *G06F 11/0733* (2013.01); *G06F 11/079* (2013.01)

(58) Field of Classification Search
None
See application file for complete search history.

(56) References Cited

U.S. PATENT DOCUMENTS

| | | | |
|---|---|---|---|
| 6,426,798 B1 * | 7/2002 | Yeung | 358/1.13 |
| 6,879,973 B2 | 4/2005 | Skaanning et al. | |
| 7,480,745 B2 * | 1/2009 | Dahneke et al. | 710/15 |
| 7,620,672 B2 | 11/2009 | Tucci | |
| 8,103,598 B2 | 1/2012 | Minka et al. | |
| 2001/0011260 A1 * | 8/2001 | Skaanning et al. | 706/46 |

OTHER PUBLICATIONS

Andrew Mccallum, Khashayar Rohanemanesh, Michael Wick, Karl Schultz, Sameer Singh, "Factorie: Efficient Probabilistic Programming for Relational Factor Graphs via Imperative Declarations of Structure, Inference and Learning", NIPS workshop on Probabilistic Programming, Vancouver, B.C., Canada, 2008.

\* cited by examiner

*Primary Examiner* — Jeffrey A Gaffin
*Assistant Examiner* — Paulinho E Smith
(74) *Attorney, Agent, or Firm* — Fay Sharpe LLP (57) ABSTRACT

A system for compiling a machine operable diagnostic system includes a header unit, a component unit, an effects unit, a test unit, and an instantiation unit. The header unit identifies general properties of a system from a generic description in an electronic format which includes at least one category of a plurality of variations. The component unit identifies a plurality of components of a modeled system from the generic description, and adds and separates the plurality of variations to the plurality of components, and each identified component includes at least one type of failure and a probability of the at least one type of failure. The effects unit identifies from the generic description a plurality of observable effects. The test unit identifies a plurality of tests and test outcomes designed to elicit the observable effects. The instantiation unit constructs a procedural instantiation of the machine operable diagnostic system.

18 Claims, 6 Drawing Sheets

FIG. 1

```
metadata {                                                          ⑱
    name: "X429 4 Color Multifunction Device"  ⎫
    author: "John. F. Bloom"                   ⎬ 21
    date: "Dec 31, 2012"                       ⎭
}
variation separations { red, yellow, cyan, black } ⎫
variation sheet_capacities { 1, 250, 500, 1000 }   ⎬ 22
variation media_weights { 20-28, 65, 110 }         ⎭ component fuser {
    cost: $450
    mode: discrete {
        values: [ ok, worn ]
        probabilities: [ 0.995, 0.005 ]
    }
}
                         ⎯32
component drum <color> {
    cost: $270 ⎯⎯⎯⎯⎯⎯⎯⎯26
    separation: <color>
    mode: discrete {
        values: [ ok, scratched, worn ] ⎯⎯28
        probabilities: [ 0.993, 0.003, 0.004 ]⎯⎯30
    }
}                        ⎯32
component media_tray <capacity, weight> {
    cost: $150
    capacity: <capacity>
    weight: <weight>
    mode: discrete {
        values: [ ok, roller_worn ]
        probabilities: [ 0.996, 0.004 ]
    }
  ⋮ effect streak <color> {
    separation: <color>
    presence: noisy_or {
        values: [ present, absent ]
        conditions: [ drum<color>.model=ok:0.9,
                      developer<color>.model=ok:0.9,
                      fuser.mode=worn:0.8 ]
    }
    polarity: full_cpt {
        values: [ dark, light ]
        table: [
            case{ values: (0.1, 0.9)
                condition: drum<color>.mode=scratched }
            case{ values: (0.9, 0.1)
                condition: drum<color>.mode=worn }
        ]
    }
}

Test polarity <color> {
    cost: $2.30 ⎯⎯⎯⎯40
    description:
    model: full_cpt {
        values: [ dark, light ]
        case ( values: (0.9, 0.1)
            condition: streak <color> .polarity=dark }
        case ( values: (0.1, 0.9)
            condition: streak <color> .polarity=light}
        ]
    }
}
```

*FIG. 2A*

```
            ⎧ instantiate fuser ─────44         (18)
            ⎪
            ⎪ for color in separations { ───46
            ⎪       instantiate drum<color>
         42 ⎨       instantiate streak<color>
            ⎪ }
            ⎪ for capacity in sheet_capacities ⎫
            ⎪    for weight in media_weights{  ⎬ 48
            ⎪       instantiate media_tray<capacity, weight>
            ⎩ }
                          •
                          •
                          •
         50 ⎰ filename: "x429.spec"
            ⎱ outputformat: "tps_bayesnet"
```

GENERIC PROGRAMMING FOR DIAGNOSTIC MODELS

BACKGROUND

The following relates to compilers which construct diagnostic system models which are used to describe, simulate and diagnose complex systems.

Many aspects of design, manufacturing, quality control, operation, and repair of complex systems can be automated if a detailed, machine interpretable model of the system behavior is provided. For example, given a diagnostic model of a printing system, the effect of a component failure can be propagated through the system in simulation and compared to actual observations to diagnosis internal problems. In a printing system, the main observable is the resulting printed page. If the system operates normally, the observed printed page reflects the intended output based on the input. However, if a component fails or is damaged, (e.g., a scratched drum) then the printed page will include an observable difference in the output such as a line streak across the page. Different types of failures result in different kinds of observable output. In the printing system example, a scratch on the drum changes the polarity of the electric field in a narrow region of the drum. The change of polarity causes a spurious sharp-edged dark narrow line on the printed page.

In many systems, determining how the component failed helps determine the source or root cause of the failure, and determining the source of the failure provides opportunities for companies to improve or change the component. Identifying possible system component failures together with knowledge of component costs and/or difficulty of repair can improve servicing of such systems. In the printing system example, normal wear to the drum can also change the polarity, and the change in polarity will typically be to a general surface area. In the printed output the area processed with the changed polarity area on the drum will be viewed with an absence of toner or color over a large region with softer edges. In both the previous examples, the system user is left with printed pages which cannot be used. However, for a supplier of the printing system, knowing whether a drum is scratched due to outside contaminants or from normal wear helps determine an appropriate response. At the very least, a model that identifies a specific component failure to be repaired or replaced provides servicing information. Where there are multiple possible component failures, diagnostic models can provide information to prioritize servicing and/or cost reduction of servicing. In complex systems, the type of failure and the components involved in the failure can provide improved development, manufacturing, supply and/or servicing of such systems.

A generic inference mechanism can use a diagnostic model of a system with components such as a printing system with drums, belts, chargers, etc. to infer diagnostic faults of the system components. The diagnostic model of the system specifies how instances of these components are connected to compute the system response to any change in the properties of a component. For example, an image with specified colors sent to a printing system is processed by pre-determined or possible components of the printing system before outputted to a printed page. The diagnostic model infers from observed output from the system which reflects usage and/or properties of components, diagnostic faults of the system components. For example, problems observed in the printed output such as lines of missing printed color in the image, areas of missing printed color in the image, etc. can infer a scratch or worn area of the drum component.

Constructing diagnostic system models is time consuming and error prone. In many systems, there are many components with slight variations or perhaps many identical components connected according to some sort of regular pattern of variations. For example, a color printing system includes adding variations of components which are separated by the individual colors. A color printer requires one toner developer unit per color separation or each color used. The toner developers are likely similar with slight or no variation except that they are tracked separately and colors can be observed separately or combined in the printed output. A fault in the cyan developer will typically affect the cyan separation in the output but not the red separation. A printed output with the color cyan will show a problem while a printed output with the color red will not show a problem to the operator of the system. However, a printed output which combines both will be observed by the operator of the system as a defect, who may only be able to distinguish that a defect has occurred. A single component may also have effects in multiple areas. In the case of the fuser, there is only one fuser for all colors, and defects in the fuser affect all color separations. A printed output of any color will show a problem to the operator of the system. Other examples of components with variations in a printing system include media input trays which vary in capacity and paper weight handling capabilities or similar finishing units with different positions designed to collate individual reports. With large numbers of components and many possible points of failure, the diagnostic model can be very large and difficult to manage and maintain.

BRIEF DESCRIPTION

A system for compiling a machine operable diagnostic system includes a header unit, a component unit, an effects unit, a test unit, and an instantiation unit. The header unit identifies general properties of a system from a generic description in an electronic format which includes at least one category of a plurality of variations. The component unit identifies a plurality of components of a modeled system from the generic description, and adds and separates the plurality of variations to the plurality of components, and each identified component includes at least one type of failure and a probability of the at least one type of failure. The effects unit identifies from the generic description a plurality of observable effects, each observable effect corresponding to at least one type of failure for at least one component. The test unit identifies from the generic description a plurality of tests and test outcomes designed to elicit the observable effects. The instantiation unit constructs a procedural instantiation of the machine operable diagnostic system based on the general properties, the identified components, the identified observable effects, and the identified tests and test outcomes.

In another aspect, a method for compiling a machine operable diagnostic system includes receiving a generic description of a system in an electronic format. General properties of the generically described system are identified from the generic description which include at least one category of a plurality of variations. A plurality of components of a modeled system are identified from the generic description, and each component includes at least one type of failure and a probability of each failure, and an assignment of the at least one category to at least one component. The variations of the assigned at least one category are added and separated to the components. A plurality of observable effects are identified from the generic description, each observable effect corresponding to at least one type of failure for at least one component. A plurality of tests and test outcomes designed to elicit the observable effects are identified from the generic description. The machine operable diagnostic system is constructed based on the identified components, the identified observable effects, and the identified tests and test outcomes. The method is performed by one or more electronic processors.

In another aspect, a system for compiling a machine operable Bayesian network includes a header unit, a component unit, an effects unit, a test unit, and an instantiation unit. The header unit identifies general properties of a generically described system from a generic description in an electronic format which includes at least one category of a plurality of variations. The component unit identifies a plurality of components of a modeled system from the generic description, and adds and separates the plurality of variations to the plurality of components, and each identified component includes at least one type of failure and a probability of the at least one type of failure. The effects unit identifies from the generic description a plurality of observable effects, each observable effect corresponding to at least one type of failure for at least one component. The test unit identifies from the generic description a plurality of tests and test outcomes designed to elicit the observable effects. The instantiation unit constructs a machine operable Bayesian network of the generically described system which includes a program variable which represents a node for each component and the component nodes comprise at least a first layer, a program variable which represents each type of failure to which transitions at least one component node based on the probability of the failure, a program variable which represents an observation node for each observed effect to which transitions at least one effect node based on the probability of observing the observed effect with the failure, and the observed nodes comprise a visible layer.

DETAILED DESCRIPTION

Figure 1:
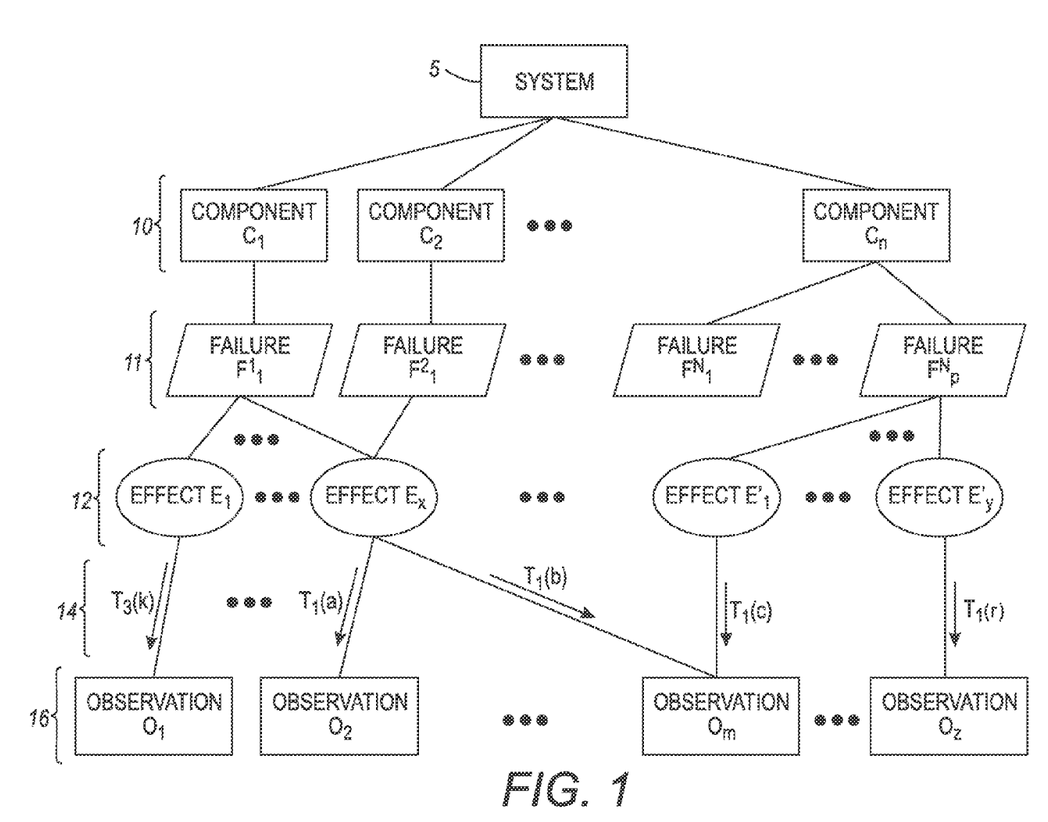
FIG. 1 is a diagram of an exemplary diagnostic system model.

With reference to FIG. 1, a diagram illustrates the conceptual form of a diagnostic system 5 which models a system with a plurality of low level components 10 which is described with a generic description. The modeled system components can include a mechanism, a device, and/or a software program. The diagnostic system 5 can be modeled with a machine operable diagnostic system such as a Bayesian Network. The diagnostic system includes representations of the modeled system components 10 such as a drum, scorotron, developer, fuser, etc. designated by $C_1, \ldots, C_n$. In another example, a computer server, e.g. modeled system includes hardware components such as disk drives, network interface cards, processors, etc., and also includes software program modules such as an HTML server, disk manager, etc. In another example, a modeled web-based system can include one or more directory servers, an HTML server, a database server, an authentication server and the like. Each represented component has one or more types of failures 11, designated for the nth component with p types of failures as $F''_1, \ldots, F''_p$ such as worn spot on a print drum, damage to a print drum, component does not operate, etc. The component failures can result in observable effects 12, such as an incorrect application of polarity at a drum location to an image output, incorrect tension with a frayed belt, etc. designated by $E_i^j$ where j is the j-th effect for the i-th component. In another example, server failures can include unavailability due to a type of hardware failure such as network card, disk access, dependent server failures and the like, and/or a software error such as an error condition from a called program, a non-response, and the like. The failure would have an effect 12 such as the inability to retrieve a particular subset of data or a returned response code. A component 10 can include a cost of the component and/or a cost to repair to replace the component.

Tests 14 are designed to elicit test outcomes 16 or observations, where the observation $O_p$ is a measurement of an effect 12 from the set of all effects which is observable. For example, a test outcome can include a dark streak on a printed page based on a test of printing a page which operates a drum to print the page and the drum includes a line of incorrect polarity which results in a dark streak. The drum includes a line of incorrect polarity due to a contaminant which scratches the surface of the drum, e.g. failure. In a Bayesian network, $O_p$ is the observable layer and $C_1, \ldots, C_n$ and $E_i^j$ are hidden layers. In the printing example, damage to the drum such as a scratch on the drum has the effect of incorrect polarity being applied to the output image. The incorrect polarity, e.g. effect, is observed on the printed page as a dark line streak, e.g. observation, in the printed image. This streak will have objective properties such as a width and sharpness of its edges which can observed by some mechanism. The observation mechanism can a sensor, or reported observations from a human observer. The set of components selected to produce the test outcome or observation based on the input and operation of the modeled system comprise the test. The test mechanism can introduce noise or deterministic biases in the resulting observation relative to the objective effect. Each test outcome 16 occurs with a probability such as shown with $T_i(n)$ where n is a probability of the observation occurring with the i-th test. A test can test more than one component and each component 10 can encounter one or more component failures 11. A test 14 can have one or more observations 16 whose likelihood of observation is conditioned on the actual effects. The test 16 can include a cost of performing the test.

Figure 2A:
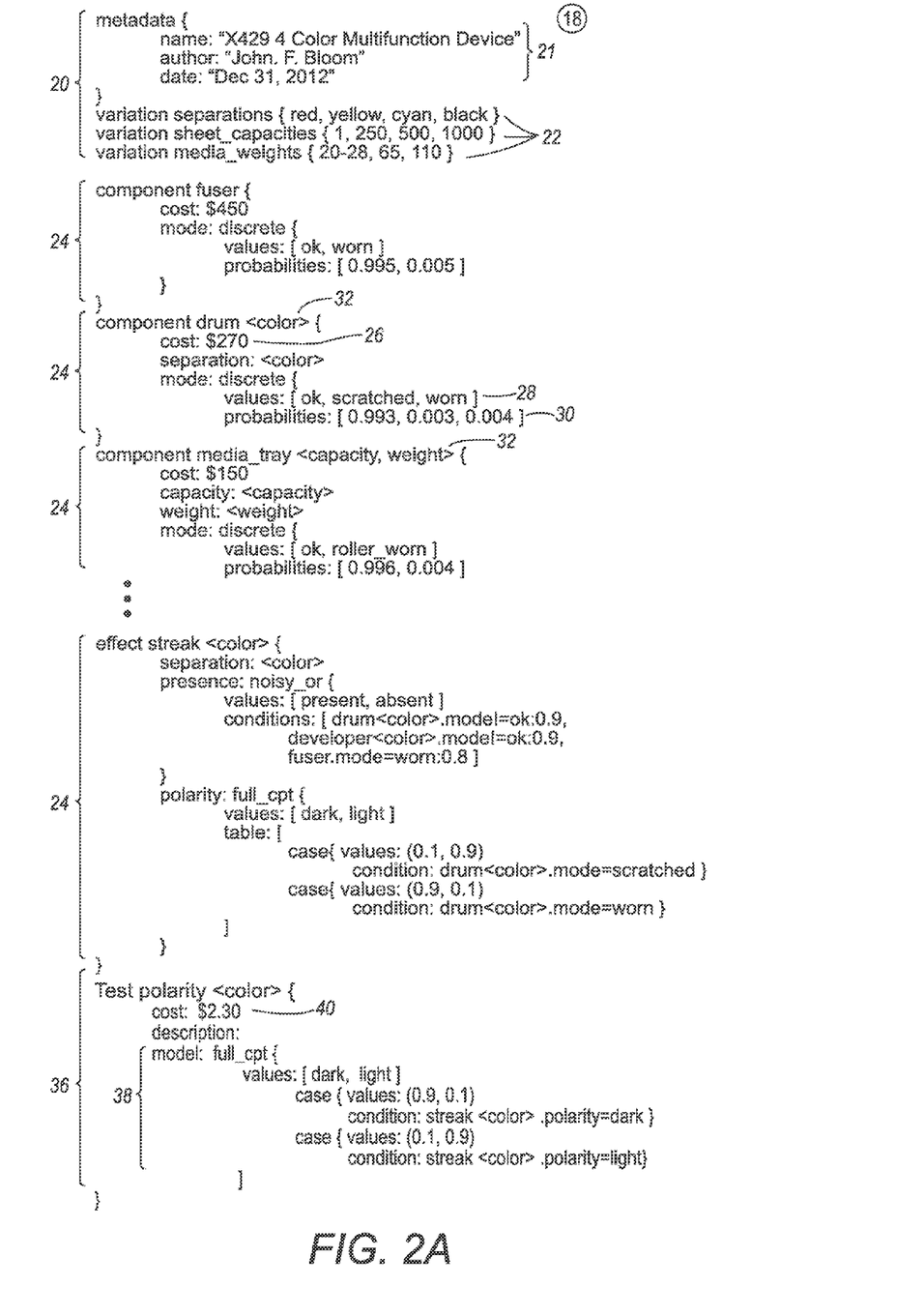
FIGS. 2A-2B include portions of an exemplary generic description.
Figure 2B:
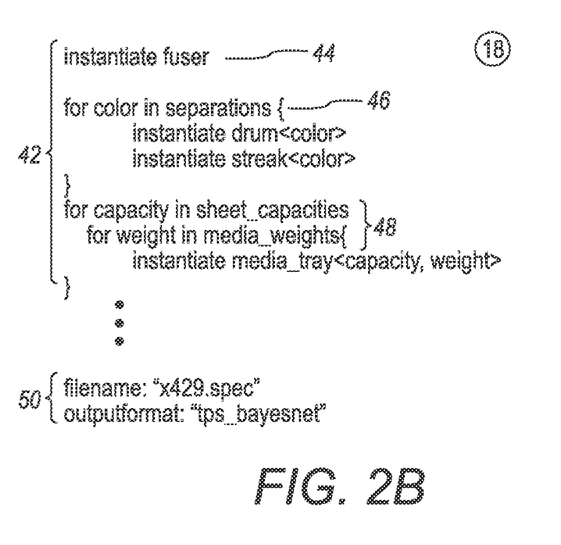

With reference to FIGS. 2A-2B, selected portions of an example generic description 18 of the diagnostic system 5 is shown. The generic description can include a complete generic description of the system or include updates or modifications to an existing description 18. In one embodiment, the generic description is a complete description and changes to the system modify the generic description. In another embodiment, an initial generic description can be modified by a second description or subsequent description, and the compiler diagnostic system includes the accumulation of the initial and subsequent descriptions. The generic description can be in the format of a text file, an XML file, and the like.

With reference to FIG. 2A, the description 18 includes header information 20. Header information can include descriptive metadata 21 such as a system name, system identifier, source, owner, creation and modification dates and the like which allow a user of the system to identify the diagnostic system or place the system in context. The header information 20 also includes at least one category 22 which defines one or more groups of variations to be added to one or more components of the system. For example, a modeled color printer system typically includes separate but like components such as toner developer units and drums for each color separation. The category can be an unordered group of variations such as a color category with black, cyan, yellow, and red. Categories can be grouped. For example, black and cyan can be grouped as dark colors and yellow and red as light colors. The category can include an order. For example, a modeled printer system which often include an order in which to use certain components such as media trays where the order is letter, legal, A4, A5, etc. Component representations such as trays and feeder mechanisms can be generated for each media type based on some simple parameters of the media type such as the media size and weight and/or tray capacity.

The description 18 includes the represented components 24 of the modeled system. For example, a modeled printer system includes a drum, a scorotron, developers, a fuser and media trays. Each component 24 can have an associated cost 26 and includes one or more types of failures 28. For example, the drum can be scratched or worn.

Each failure has a prior probability 30 based on manufacturing and design constraints combined with information from typical use in the field. The probability can be included in the generated system or be parameterized and provided at execution time of the diagnostic system. In this example, it is given as a discrete probability distribution. Components may also have additional descriptive fields not shown here.

Variations of the components 32 are represented here as a generic parameter of the component model. We use angle brackets to indicate a category or generic parameter of a model (e.g., <color>). The fuser has no variations. The drum has color variations and the media tray has both capacity and media weight variations. Other syntax for specifying categories of variations are contemplated.

The description 18 includes one or more effects 34 which describe the effect of failures on the behavior of the system. For example, a possible effect would be a streak on the printed page. The streak has attributes such as whether it is present or not and its polarity (e.g., dark or light). The effect can include a category of variations. In this instance, a separate streak effect in each possible color variation is included by parameterizing the streak by the <color> generic parameter. The probability of the effect is defined by a probability distribution. This distribution can take different forms such as a "noisy or" distribution or a generic full conditional probability table and the like. Considerable detail is omitted from the Conditional Probability Table (CPT) to simplify presentation.

The description 18 includes one or more tests 36 and each test includes one or more test outcomes 38. The test can include a cost 40 of performing the test which is compiled into the diagnostic system model 5. The test can reveal information about multiple components. For example, a test can test the polarity of the application of toner to a page could reveal information about any of the components jointly required to produce output on the page. A test can also potentially reveal information about multiple effects simultaneously. The tests are assigned a probability conditioned on the actual effects of component failure. The test outcomes 38 of the test 36 for drum polarity include outcomes of a dark or a light streak on a printed page.

With reference to FIG. 2B, once the components, effects, tests and outcomes, and their variations have been defined, generic procedural scripting constructs 42 can be used to instantiate the system with appropriate connections. Instantiation can be a simple atomic statement 44 such as the fuser, loop 46 such as drum, a complex nested loop 48 such as media_tray, and the like. In the media_tray example, the instantiation adds and separates the cross product of the categories capacity and weight. In the instantiation of the drum, the category of color is added to the drum component which separates and adds color variation to the drum component. Additional constructs based on assignments, conditionals and loops can be used to construct a complex model from a generic description or simple procedural specification.

The generic description 18 can include requirements statements 50 that describe what should be produced from the generic description. For example, a statement can direct the output of the diagnostic system model to a specific location such as a directory location, filename, etc. A requirements statement can specify that the generic description be compiled into a format suitable for a specific type of inference system such as a Bayes network file or dependency matrix. The requirements statements can be included in the generic description or placed in a separate file.

Figure 3A:
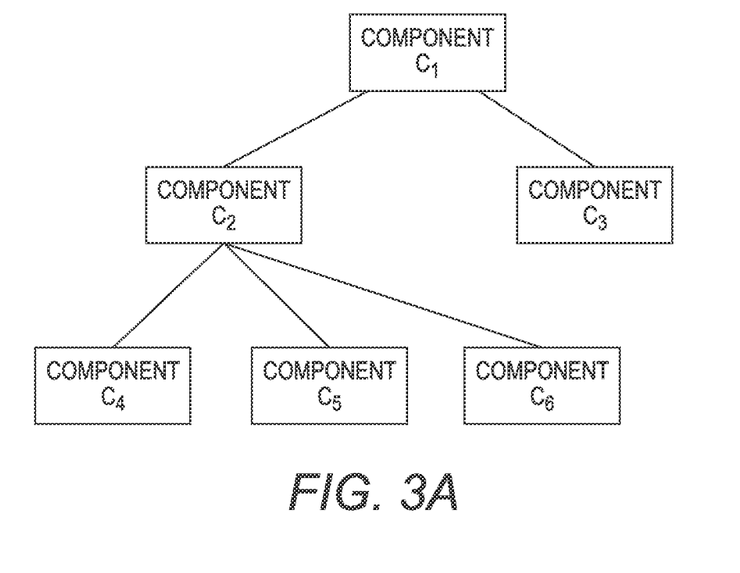
FIG. 3A is a diagram of an exemplary component grouping.

With reference to FIG. 3A, the system can optionally explode high level components into low level components as diagrammed in the example. High level component $C_1$ is comprised of subcomponents $C_2$ and $C_3$. Subcomponent $C_2$ is comprised of subcomponents $C_4$, $C_5$, and $C_6$. Thus the high level component $C_1$ explodes to, or groups low level components $C_3$, $C_4$, $C_5$, and $C_6$. Components that contain subcomponents are called assemblies. Assemblies are crucial to effective diagnostic systems as they can be used to represent user replaceable units. For example, it may be that the scorotron has failed on a printer, however, the scorotron and drum are packaged into a: "print cartridge" assembly. Representing assemblies explicitly allows the system to give the user an actionable recommendation: replace the "print cartridge" with a new one from the catalog. Instantiation can include replacing a component which is an assembly with the low level components analogous to adding and separating a category of variations. In the example, using $C_1$ in the generic description can be instantiated into $C_3$, $C_4$, $C_5$, and $C_6$.

Figure 3B:
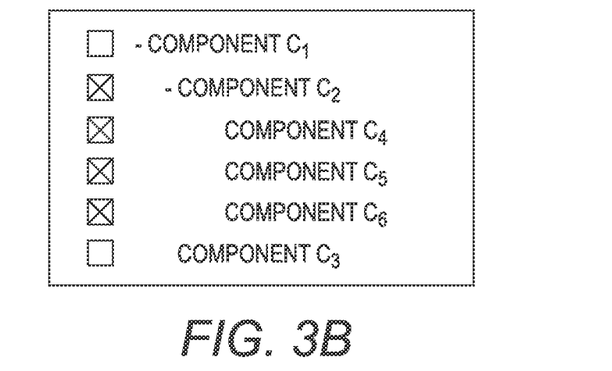
FIG. 3B is a diagram of an exemplary graphical user interface selection of components.

Components can be identified in the description 18 based on the component name or identification number. FIG. 3B illustrates an embodiment of a graphical user interface which allows the user to select components based on a high level component. Selecting the high level components selects all the components grouped as subcomponents of the high level component. Selection can utilize a mouse click of a check box, radio button, etc. The graphical user interface can use explosion of components analogous to the drill down of directory structures typically found with many operating systems. Alternatively, individual low level components can be selected directly. This allows faster selection and less error than with manual entry. Another embodiment uses highlighting, copying, and pasting to select components for inclusion in the generic description.

Figure 4:
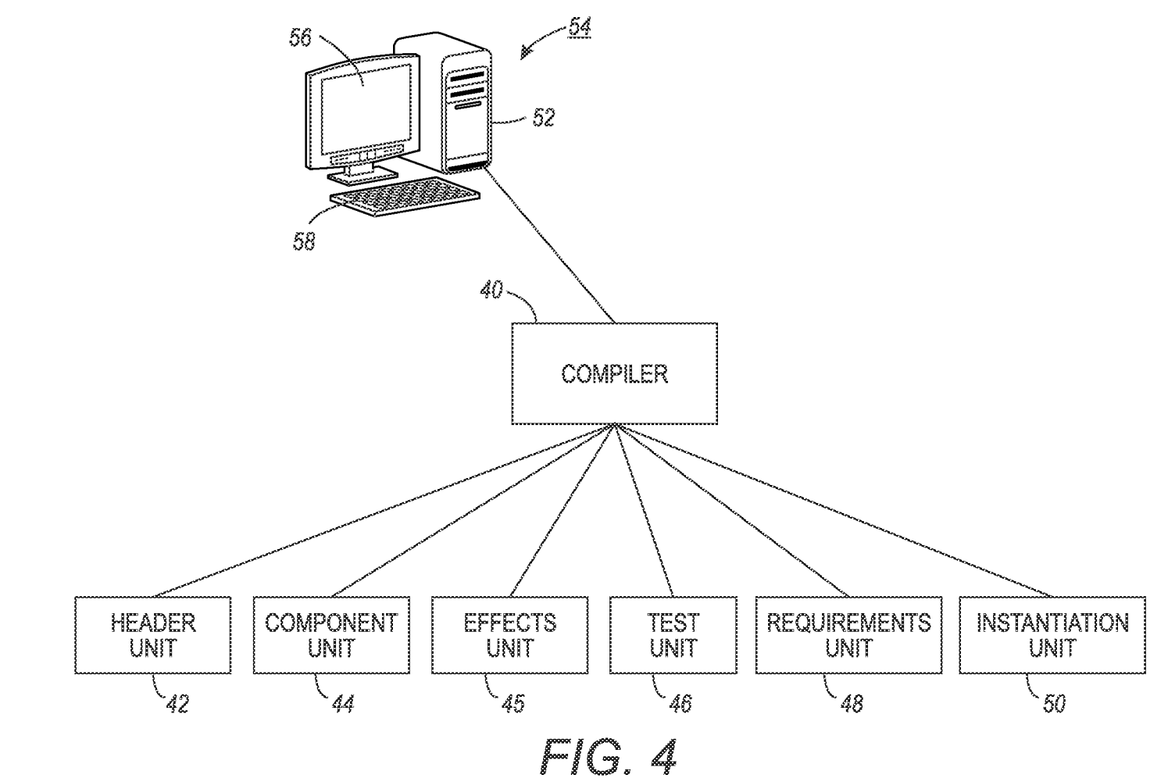
FIG. 4 is a system block diagram of one embodiment of the system.

With reference to FIG. 4, a system block diagram illustrates the compiler system 40 and elements. The compiler 40 inputs a generic description 18 of the diagnostic system 5 such as a list format, XML format, via a graphical user interface, etc. which describes at least one of a mechanism, device, or a software program. The generic description 18 can include traditional programming constructs such as a sequence, a repetition, a conditional, an assignment, any combination, and the like. The compiler 40 includes a header unit 42, a component unit 44, an effects unit 45, a test unit 46, and an instantiation unit 50. The compiler can include a requirements unit 48. The generic description is received in an electronic format.

The header unit 42 identifies from the generic description general properties of the system which include at least one category of a plurality of variations. The general properties of the system can include configuration information such as the system name, type of system, and the like. The categories of variations are applied in constructing the diagnostic model. Categories 22 can include hierarchies and/or an order.

The component unit 44 identifies components 10 from the generic description 18, and adds and separates assigned categories of variations to the components. Each identified component includes at least one type of failure and a probability of the failure. An identified component can include a category assignment which instantiates as multiple components varied by the variations in the category assigned. Components can be added with sub-components or grouping analogous to a bill of material list and described in references to FIGS. 4A and 4B. Components can include a cost such as a repair and/or replacement cost.

The effects unit 45 identifies observable effects 12 from the generic description. Each observable effect corresponds to at least one type of failure 11 for at least one component 10. The effects relate to components based on the generic description.

The test unit 46 identifies tests 14 and test outcomes 16 described in the generic description 18 of the system 5. Tests are designed to elicit observable effects in test outcomes. Tests are operations of the modeled system or simulations of the diagnostic model which test various properties of the diagnostic system and assign different possible outcomes. Identified tests include a test name and can include a test cost.

The requirements unit 48 identifies any requirements for the diagnostic system such as destination or form of the diagnostic system. The requirements can be included in the generic description or included in a separate file.

The instantiation unit 50 constructs a procedural instantiation of the diagnostic system 5 based on the identified general properties, the identified components, the identified observed effects, and the identified tests and test outcomes. The procedural instantiation of the diagnostic system can include a Bayesian Network (BN), the instantiation unit generates a variable for each node in the BN. The BN includes component nodes for each identified component including the components expanded and separated through assignment to a category and/or assembly. The component nodes form a first layer. The BN includes an effect node for each observable effect to which transitions at least one component node based on a probability of a failure. The BN includes observation nodes for each test outcome to which transitions at least one effect node based on the probability of observing the observed effect in the outcome. The observations nodes comprise a visible layer. The BN can be represented in a machine operable system such as JAVA and C programming language statements and the like.

The various units or modules 42, 44, 45, 46, 48, and 50 are suitably embodied by an electronic data processing device 52, such as an electronic processor or electronic processing device of a computer 54, or server, or so forth. Moreover, the disclosed identification and construction techniques are suitably implemented as a non-transitory storage medium storing instructions (e.g., software) readable by an electronic data processing device and executable by the electronic data processing device to perform the disclosed identification techniques. The computer can include a display 56 and one or more input devices 58 to create and view the generic description. The computer can further be used to operate the constructed diagnostic model such as a constructed Bayesian Network.

Figure 5:
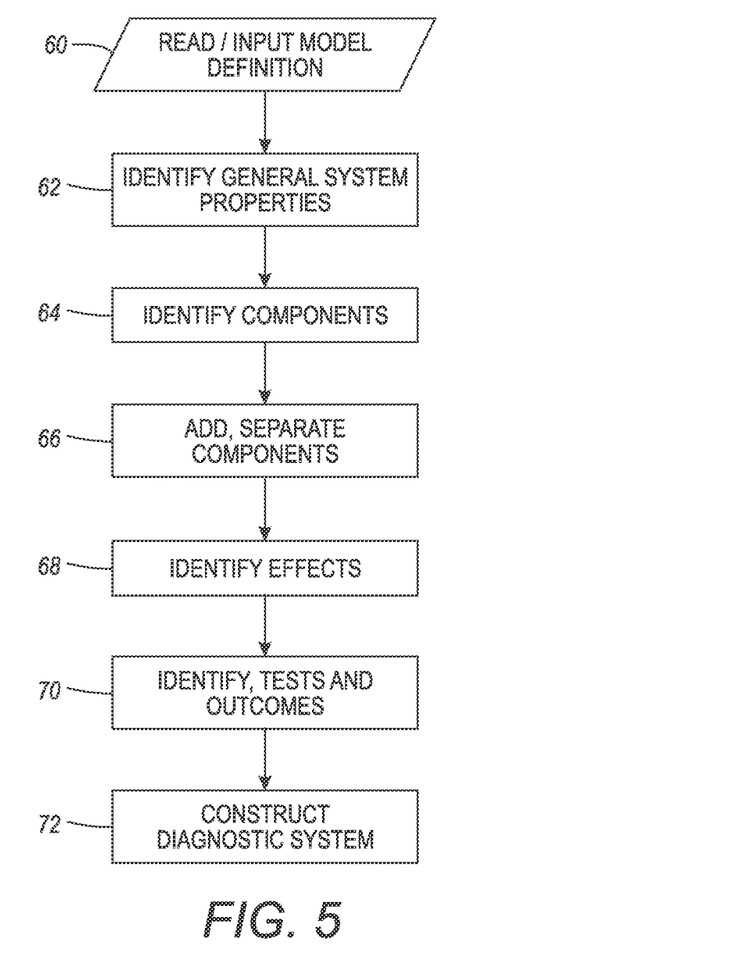
FIG. 5 is a flowchart of an embodiment of a method of generating a diagnostic system from a generic description.

With reference to FIG. 5, an embodiment of a method is flowcharted. The method begins with a step 60, in which the generic description is input into the compiler system 40. The description is in an electronic format. The description 18 can be input manually via the computer 54 input device and/or constructed in whole or in part from other electronic sources. The system operates to compile and/or interpret statements in different embodiments. An interpreter operates on generic statement by generic statement delimited by a delimiter such as a semicolon, line feed, carriage return, end of record; and the like. A compiler processes all statements together. The generic description includes programming constructs such as assignment and block assignment, conditions, repetition and sequence. The generic description uses keywords and/or special characters to instantiate components, categories, effects, tests, and test outcomes. Probabilities can be added as parameters with initial values such as with types of component failures, observable effects, etc.

In a step 62, the general properties of the described system are identified such as the system name. The general properties include at least one category of a plurality of variations. The categories and the variations within each category are identified.

The plurality of components are identified in a step 64. The plurality of components include the component and component information. The component information includes any categories assigned to the component, and one or more types of failures for each component and the corresponding probability of failure for each failure type. Components are added and separated based on the variations of the assigned categories and/or assemblies in a step 66.

The plurality of observable effects are identified in a step 68. Each observable effect corresponds to at least one type of failure for at least one component.

The plurality of tests and test outcomes designed to elicit observable effects are identified in a step 70. The plurality of tests can include a cost for performing the test, and include a one or more test outcomes for each test.

In a step 72, the instantiation unit 50 instantiates a diagnostic system 5. For example, the compiler constructs a Bayesian Network model. An output format can be determined by requirements statements, a requirements file, and/or compiler defaults. Depending on the requirements, the instantiated diagnostic system can be programming statements which are further processed in a particular programming language or machine operable object code. The instantiated system 5 connects all components together to form a complete diagnostic system. The connections between components fully describe the properties which operate on the diagnostic system. The constructed diagnostic system can include repeated components attached in a regular fashion.

As new components are added or components changed to the modeled system, the generic description is modified and compiled into a new diagnostic system model. The generic description 18 compactly describes the system 5. The description more easily identifies the components in the modeled system than a diagnostic model such as an explicit Bayesian Network model. The generic description reduces the size of the stored system description. The generic description more easily describes changes and/or modifications to the system.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for compiling a machine operable diagnostic system, including an electronic processor, the electronic processor comprising:
   a header unit which identifies general properties of a system from a generic description in an electronic format which includes at least one category of a plurality of variations;
   a component unit which identifies a plurality of components of a modeled system from the generic description, and adds and separates the plurality of variations to the plurality of components, and each identified component includes at least one type of failure and a probability of the at least one type of failure;
   an effects unit which identifies from the generic description a plurality of observable effects, each observable effect corresponding to at least one type of failure for at least one component;
   a test unit which identifies from the generic description a plurality of tests and test outcomes designed to elicit the observable effects; and
   an instantiation unit which constructs a procedural instantiation of the machine operable diagnostic system based on the general properties, the identified components, the identified observable effects, and the identified tests and test outcomes;
   wherein the constructed diagnostic system includes a Bayesian network of a plurality of nodes and each node is represented by a program variable, the Bayesian network comprising:
   a component node for each identified component and the component nodes comprise at least a first layer;
   an effect node for each observable effect to which transitions at least one component node based on the probability of the failure;
   an observation node for each test outcome to which transitions at least one effect node based on the probability of observing the observed effect in the test outcome, and the observation nodes comprise a visible layer.

2. The system according to claim 1, wherein the generic description describes a system which includes representations of at least one of a mechanism, a device, or a software program.

3. The system according to claim 1, wherein each identified test includes cost information.

4. The system according to claim 1, wherein each identified component includes at least one of:
   cost of repairing the component; or
   cost of replacing the component.

5. The system according to claim 1, wherein the generic description includes at least one of keywords or delimiters which identify the categories, the components, the tests, and the observable effects.

6. The system according to claim 1, wherein the at least one category includes an ordering of the variations.

7. The system according to claim 1, wherein the at least one category includes a grouping of variations.

8. The system according to claim 1, wherein the constructed system includes JAVA programming language statements.

9. The system according to claim 1, wherein instantiation of the at least category is deferred until execution time.

10. The system according to claim 1, wherein the plurality of components represent a printer system and the at least one category includes one of a color separation, or a media type.

11. A method for compiling a machine operable diagnostic system, comprising:
   receiving a generic description of a system in an electronic format;
   identifying from the generic description, general properties of the generically described system which include at least one category of a plurality of variations;
   identifying from the generic description a plurality of components of a modeled system, and each component includes at least one type of failure and a probability of each failure, and an assignment of the at least one category to at least one component;
   adding and separating the variations of the assigned at least one category to the components;
   identifying from the generic description a plurality of observable effects, each observable effect corresponding to at least one type of failure for at least one component;
   identifying from the generic description a plurality of tests and test outcomes designed to elicit the observable effects;
   instantiating the machine operable diagnostic system based on the identified components, the identified observable effects, and the identified tests and test outcomes;
   wherein the method is performed by one or more electronic processors; and
   wherein instantiating the diagnostic system includes:
   constructing a Bayesian network of a plurality of nodes and each node is represented by a program variable, the Bayesian network comprising:
   a component node for each component and the components comprise at least a first layer;
   an effect node for each type of failure to which transitions at least one component node based on the probability of the failure;
   an observation node for each observed effect to which transitions at least one effect node based on the probability of observing the observed effect with the failure, and the observed nodes comprise a visible layer.

12. The method according to claim 11, wherein the generic description describes a system which includes a representation of at least one of a mechanism, a device, or a software program.

13. The method according to claim 11, wherein the generic description includes keywords and delimiters which identify the categories, the components, the tests, and the observed effects.

14. The method according to claim 11, wherein the at least one category includes an ordering of the variations.

15. The method according to claim 11, wherein the instantiating further includes:
   generating JAVA programming language statements.

16. The method according to claim 11, wherein the at least category assigned to at least one component is based on a grouping of components.

17. The method according to claim 11, wherein the components represent a printer system and the at least one category includes one of a color separation, or a media type.

18. A system for compiling a machine operable Bayesian network, including an electronic processor, the electronic processor comprising:
   a header unit which identifies general properties of a generically described system from a generic description in an electronic format which includes at least one category of a plurality of variations;
   a component unit which identifies a plurality of components of a modeled system from the generic description, and adds and separates the plurality of variations to the plurality of components, and each identified component includes at least one type of failure and a probability of the at least one type of failure;

an effects unit which identifies from the generic description a plurality of observable effects, each observable effect corresponding to at least one type of failure for at least one component;

a test unit which identifies from the generic description a plurality of tests and test outcomes designed to elicit the observable effects; and an instantiation unit which constructs a machine operable Bayesian network of the generically described system which includes:

a program variable which represents a node for each component and the component nodes comprise at least a first layer;

a program variable which represents each type of failure to which transitions at least one component node based on the probability of the failure;

a program variable which represents an observation node for each observed effect to which transitions at least one effect node based on the probability of observing the observed effect with the failure, and the observed nodes comprise a visible layer.

* * * * *